A. A. RUTTAN & C. E. HUTCHINGS.
VIEW FINDER.
APPLICATION FILED SEPT. 19, 1912.
1,060,636.
Patented May 6, 1913.
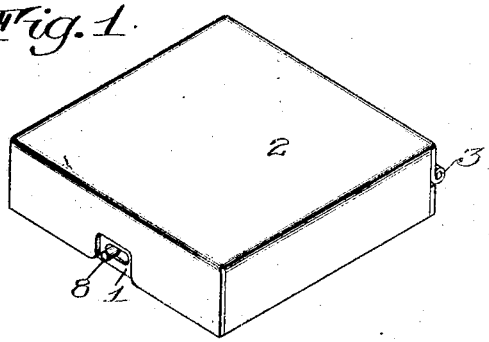
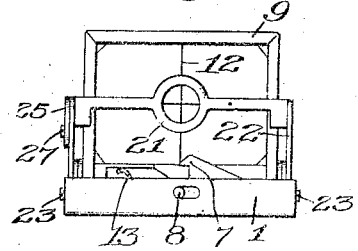
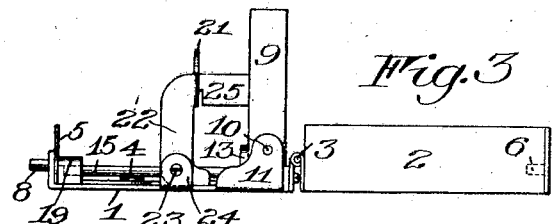
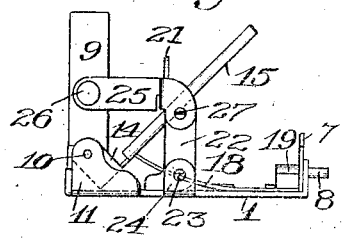
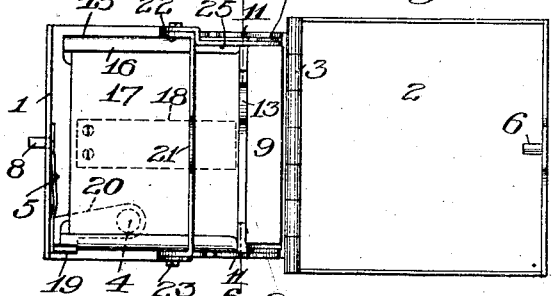
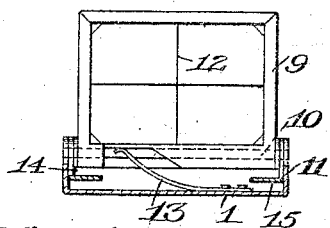
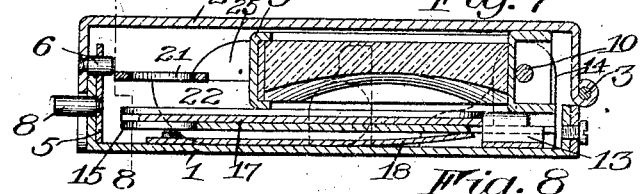
Witnesses
Inventors
Alfred A. Ruttan
Charles E. Hutchings
By
Their Attorneys

UNITED STATES PATENT OFFICE.

ALFRED A. RUTTAN AND CHARLES E. HUTCHINGS, OF ROCHESTER, NEW YORK, ASSIGNORS TO EASTMAN KODAK COMPANY, OF ROCHESTER, NEW YORK, A CORPORATION OF NEW YORK.

VIEW-FINDER.

1,060,636.

Specification of Letters Patent.

Patented May 6, 1913.

Application filed September 19, 1912. Serial No. 721,173.

*To all whom it may concern:*

Be it known that we, ALFRED A. RUTTAN and CHARLES E. HUTCHINGS, of Rochester, in the county of Monroe and State of New York, have invented certain new and useful Improvements in View-Finders; and we do hereby declare the following to be a full, clear, and exact description of the same, reference being had to the accompanying drawings, forming a part of this specification, and to the reference-numerals marked thereon.

Our present invention relates to photography, and more particularly to photographic cameras and attachments therefor, and it has for its object to provide a simple, durable and efficient view finder for cameras and similar instruments.

Further objects of the invention are to provide a finder that is neat and compact and which will offer certain advantages with respect to the dual function of sighting either coincidently with or at an angle to the optical axis of the finder lens.

To these and other ends the invention consists in certain improvements and combinations of parts all as will be hereinafter more fully described, the novel features being pointed out in the claims at the end of the specification.

In the drawings: Figure 1 is a perspective view of the finder casing shown closed; Fig. 2 is a front elevation of the finder in operative position for sighting coincidently with the axis of the finder lens; Fig. 3 is a side elevation corresponding to Fig. 2; Fig. 4 is a top plan view corresponding to Figs. 2 and 3; Fig. 5 is a side elevation showing the angle mirror in operative position for sighting at right angles to the optical axis; Fig. 6 is a section taken substantially on the line 6—6 of Fig. 5 with the mirror removed; Fig. 7 is a longitudinal central section through the finder in folded position inclosed within its casing, and Fig. 8 is a section taken substantially on the line 8—8 of Fig. 7.

Similar reference numerals throughout the several figures indicate the same parts.

We have illustrated a finder constructed in accordance with and illustrating one embodiment of our invention which, however, is not shown mounted on the camera or other instrument for use in connection with which it is intended. Those skilled in the art understand the mode of use, the finder being placed at any convenient point but as near the lens of the instrument as possible and with the axis of its own lens parallel with the axis of the lens of such instrument. To this end, an attaching plate 1 is provided that forms the bottom of the casing having a cover 2 hinged at 3 and provided with flanges that completely inclose the finder when in folded position as shown in Fig. 1. The spring actuated finder parts hereinafter described have a normal tendency to open the cover 2 so that a spring latch 20 pivoted at 4 to the plate or bottom 1 (Fig. 4) and having a vertical extension 5 projecting across the front of the casing is provided to hold the cover closed by the coöperation of a pin 6 (Fig. 7) with an engaging portion 7 (Fig. 8) on the latch. The latch is released through the medium of an operating portion 8 projecting exteriorly of the casing and the spring action is obtained by the engagement of the resilient extension 5 with the front of the casing as the latch turns on its pivot.

The finder lens 9 in a suitable frame is pivoted at 10 to bearing ears 11 on the plate 1 at one side of the latter adjacent to the hinge 3 of the cover 2. The lens may be of the ordinary reflecting type known in the art and is provided with cross hairs 12. It has a normal tendency to assume an erect or operative position under the influence of a spring 13 (Fig. 6) the latter being in the present instance a leaf spring secured to the plate 1.

Arranged preferably on the same pivot with the lens by means of bearing ears 14, is the mirror frame 15 having flanged edges 16 adapted to removably receive a slidably detachable mirror 17. We prefer to form this mirror from a highly polished metal plate in order to obviate the inaccuracy of reflection present in an ordinary mirror due to the refraction between the surface of the glass and the backing. The mirror frame is adapted to fold against the plate 1 beneath the lens but, like the lens, has a normal tendency to assume the operative position shown in Fig. 5 under the influence of a leaf spring 18. When in folded position, the mirror is restrained by engagement with an abutment 19 formed at a convenient point on the same latch 20 that locks the cover 2 of the casing so that as the cover is released the mirror is also released.

The peep-sight for alining the vision with respect to the optical axis of the lens and thus centering the image on the lens, has its globe 21 carried on a yoke shaped member 22 extending between the lens and mirror when both are in operative position, and pivoted at 23 to bearing ears 24 on the plate 1. A link 25 connects the lens frame and mirror frame being pivoted to one at 26 and to the other at 27 so that when the mirror assumes its operative position under the influence of its spring it also draws the sight to operative position. As the sight also acts as a stop for defining the operative position of the mirror, the link connection 25 between the sight and lens also causes it, by virtue of such engagement, to actuate the mirror to folded position ahead of the lens when the latter is folded, all three parts moving to position in a direction away from the pivotal axis of the lens.

No detail description of the use of the device is thought to be necessary. When the cover 2 is released the spring actuated lens 9 throws it open; the lens assumes its erect or operative position drawing the sight after it and the mirror flies up under the influence of its own spring against the sight. If the view is to be observed from above or to one side of the axis of the lens, the mirror is allowed to remain in operative position where the image on the lens with the finder outlined against it will be reflected thereon and viewable at the angle of incidence. If the image is to be viewed directly along the axis of the finder lens with the eye directly behind the sight, the mirror is folded down after the opening of the cover, and reëngaged with the latch 20 leaving the other parts still in operative positions.

We claim as our invention:

1. In a finder, the combination with a lens and an angle mirror, of a sight having an operative position between the lens and mirror along the line of the axis of the lens.

2. In a folding finder, the combination with a pivoted lens and a pivoted angle mirror arranged to fold beneath the lens, of a pivoted sight having an operative position between the lens and mirror.

3. In a folding finder, the combination with a pivoted lens and a pivoted angle mirror arranged to fold beneath the lens, of a pivoted yoke shaped sight arranged to span the optical axis of the lens between the latter and the mirror and to fold against the mirror.

4. In a folding finder, the combination with a pivoted lens, a pivoted angle mirror and a spring for actuating the latter toward its operative position, of a pivoted sight having an operative position between the lens and mirror and arranged to act as a stop for the mirror defining the operative position of the latter.

5. In a folding finder, the combination with a pivoted lens, a pivoted angle mirror and a spring for actuating each part toward its operative position, of a pivoted sight having an operative position between the lens and mirror and coöperating with the latter to actuate it to folded position and a link connection between the lens and sight.

6. In a folding finder, the combination with a casing and a pivoted finder lens therein, of a spring for actuating the lens to operative position, a cover adapted to be thrown open by the movement of the lens and a latch for locking the cover.

7. In a folding finder, the combination with a casing and a pivoted finder lens and a pivoted angle mirror therein, of a spring for operating each of said devices to operative position, a cover adapted to be thrown open by the movement of the lens, a latch for locking the cover closed and an abutment on the latch coöperating with the mirror to lock the latter in folded position.

8. In a folding finder, the combination with a pivoted lens and a pivoted angle mirror arranged to fold beneath the lens, of a pivoted sight foldable against the mirror and movable, when folded, in a direction away from the pivotal center of the lens.

ALFRED A. RUTTAN.
CHARLES E. HUTCHINGS.

Witnesses:
HENRY W. HALL,
WALTER B. PAYNE.